US007784518B2

(12) United States Patent
Chen

(10) Patent No.: US 7,784,518 B2
(45) Date of Patent: Aug. 31, 2010

(54) TOOL FOR MAKING AN ILLUSTRATED CARD WITH PAILLETTES

(76) Inventor: Teng-Kuei Chen, 11Fl., No. 63, Lane 122, Sec. 4, Jen-Ai Rd., Taipei (TW)

( * ) Notice: Subject to any disclaimer, the term of this patent is extended or adjusted under 35 U.S.C. 154(b) by 718 days.

(21) Appl. No.: 11/798,569

(22) Filed: May 15, 2007

(65) Prior Publication Data

US 2008/0283193 A1 Nov. 20, 2008

(51) Int. Cl.
*B44C 1/00* (2006.01)
*B32B 37/18* (2006.01)

(52) U.S. Cl. ......................... 156/579; 156/574; 294/1.1

(58) Field of Classification Search .................. 294/1.1; 156/574, 579
See application file for complete search history.

(56) References Cited

U.S. PATENT DOCUMENTS

| | | | | |
|---|---|---|---|---|
| 3,797,875 | A * | 3/1974 | den Hamer | 294/1.1 |
| 3,974,539 | A * | 8/1976 | Barouh et al. | 15/104.001 |
| 4,600,227 | A * | 7/1986 | Ennis et al. | 294/1.1 |
| 5,423,411 | A * | 6/1995 | Kennett | 198/494 |
| 2005/0161961 | A1* | 7/2005 | Ruff et al. | 294/1.1 |
| 2009/0242117 | A1* | 10/2009 | Gupta | 156/297 |

* cited by examiner

*Primary Examiner*—Mark A Osele
(74) *Attorney, Agent, or Firm*—Hershkovitz & Associates, LLC; Abraham Hershkovitz

(57) ABSTRACT

A tool has a body having a blunt end and an adhesive end. The adhesive end has a fastener and an adhesive element. The fastener protrudes from the adhesive end of the body. The adhesive element is made of resin and fastened by the fastener. The paillettes can be adhered more easily and rapidly by the adhesive element than by a user's hand. Thus, using the tool of the present invention to make the illustrated card is convenient for the users.

3 Claims, 7 Drawing Sheets

TOOL FOR MAKING AN ILLUSTRATED CARD WITH PAILLETTES

BACKGROUND OF THE INVENTION

1. Field of Invention

The present invention relates to a tool, and more particularly to a tool for making an illustrated card with paillettes that can train children to arrange multiple colorful paillettes on the illustrated card to improve their sense of chromatology.

2. Description of the Related Art

An illustrated card can be used as a greeting card or a decoration on a wall. A conventional illustrated card has two surfaces. However, at least one surface has words or patterns, so users can not make and arrange the pattern or color on the surface by themselves. Thus, the conventional illustrated card is boring for users.

Additionally, children usually use color pens, watercolors, crayons or the like to daub. They usually fill colors on a coloring book that has a pattern contour on each page so that they can recognize and distinguish various colors and can applying tones. However, the coloring book can not be made to have a three-dimensional structure, so the coloring book can not attract children for a long time. Furthermore, children using color pens, watercolors, crayons or the like may contaminate their hands and clothes, which would annoy their parents.

To overcome the shortcomings, the present invention provides a tool for making an illustrated card with paillettes to mitigate or obviate the aforementioned.

SUMMARY OF THE INVENTION

The primary objective of the present invention is to provide a tool for making an illustrated card with paillettes that can train children to arrange multiple colorful paillettes on the illustrated card to improve their sense of chromatology.

To achieve the objective, the tool in accordance with the present invention has a body having a blunt end and an adhesive end. The adhesive end has a fastener and an adhesive element. The fastener protrudes from the adhesive end of the body. The adhesive element is made of resin and fastened by the fastener. The paillettes can be adhered more easily and rapidly by the adhesive element than by a user's hand. Thus, using the tool of the present invention to make the illustrated card is convenient for the users.

Other objectives, advantages and novel features of the invention will become more apparent from the following detailed description when taken in conjunction with the accompanying drawings.

DETAILED DESCRIPTION OF THE INVENTION

Figure 1:
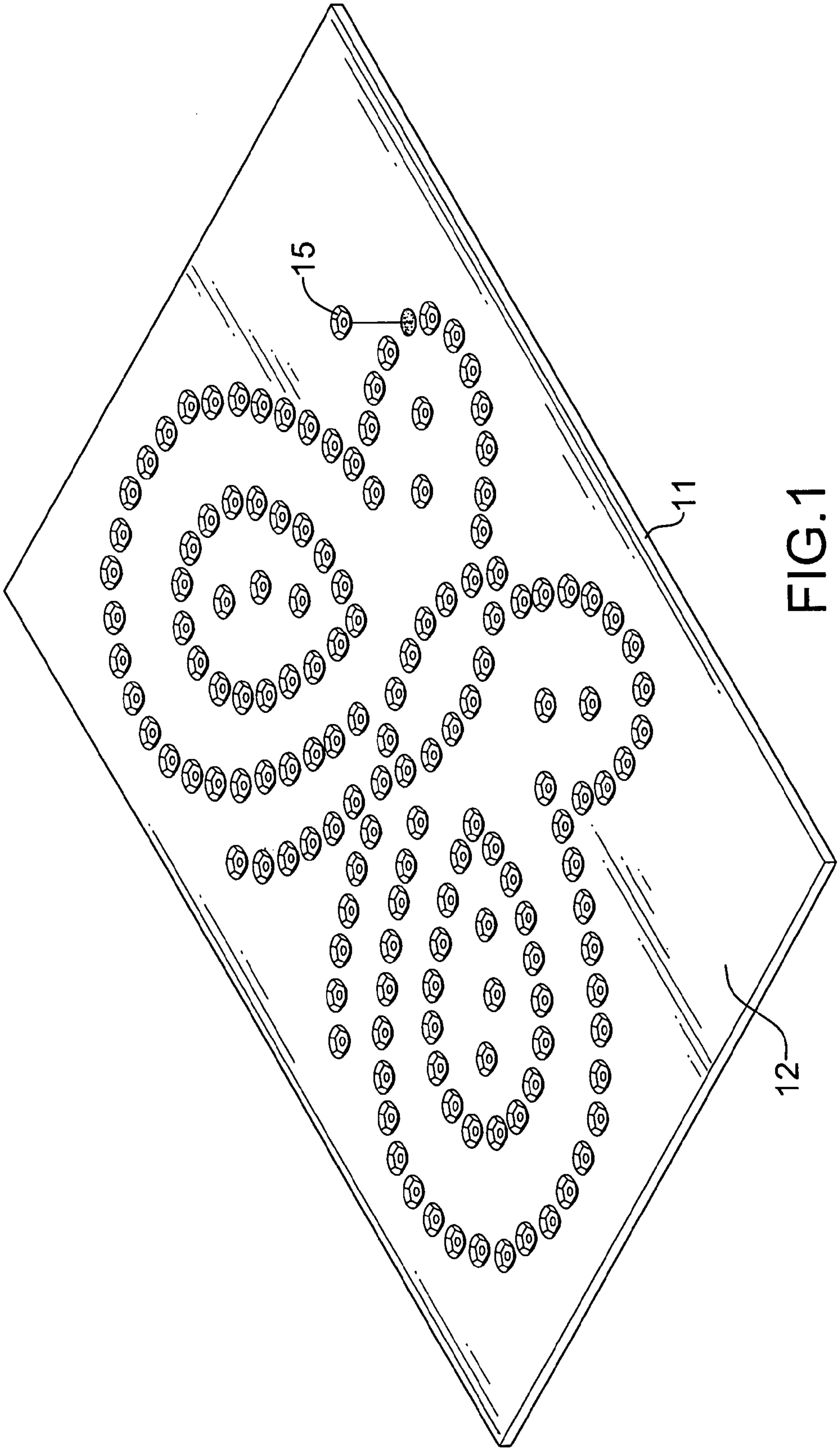
FIG. 1 is a perspective view of an illustrated card with paillettes in accordance with the present invention.

With reference to FIG. 1, an illustrated card in accordance with the present invention has a cardboard (11), at least one printing layer and multiple paillettes (15).

The cardboard (11) has two surfaces.

Each of the at least one printing layer is mounted on one of the surfaces of the cardboard (11) and has a pattern ink layer (12) and multiple adhesive spots (14).

Figure 2:
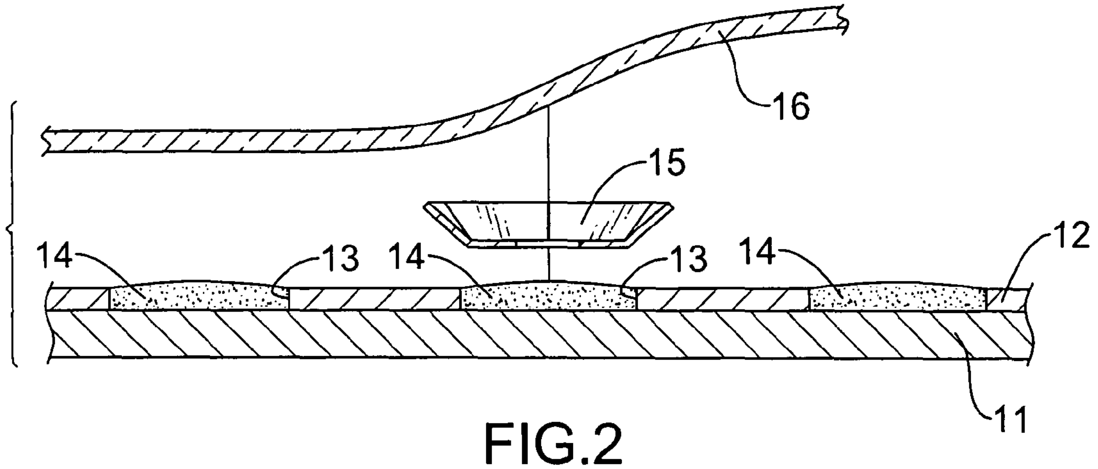
FIG. 2 is an exploded cross sectional side view of a first embodiment of the illustrated card with paillettes in FIG. 1 with a release paper.
Figure 4:
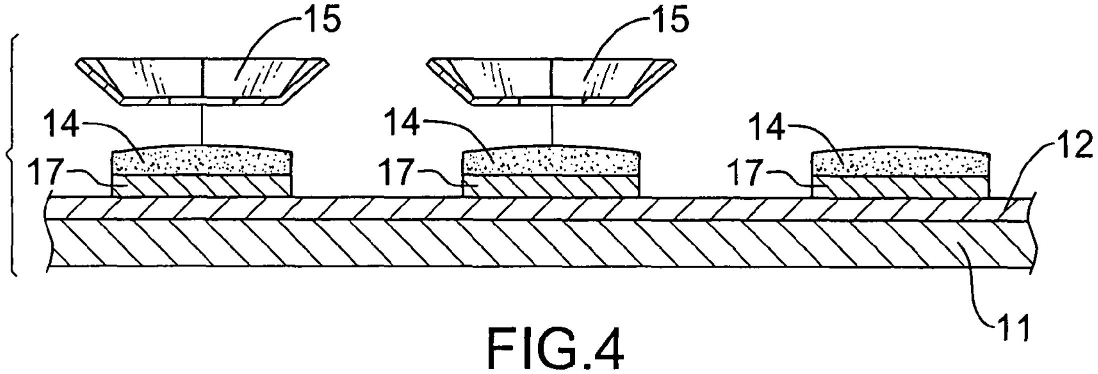
FIG. 4 is an exploded cross sectional side view of a third embodiment of the illustrated card in FIG. 1.

With further reference to FIGS. 2 and 4, the pattern ink layer (12) arranges a pattern and may be monochrome or polychrome. The pattern can be a completed figure such as characters, words, a human figure, an animal, a plant or the like or a part of the pattern such as a skirt or hair of the human figure or petals of the plant. The pattern ink layer (12) of a first embodiment of the illustrated card has multiple recesses (13). The recesses (13) are formed in the pattern ink layer (12) to arrange the pattern. The pattern ink layer (12) of a third embodiment of the illustrated card has multiple pigment spots (17). The pigment spots (17) are mounted on the patter ink layer (12) to arrange the pattern.

Figure 3:
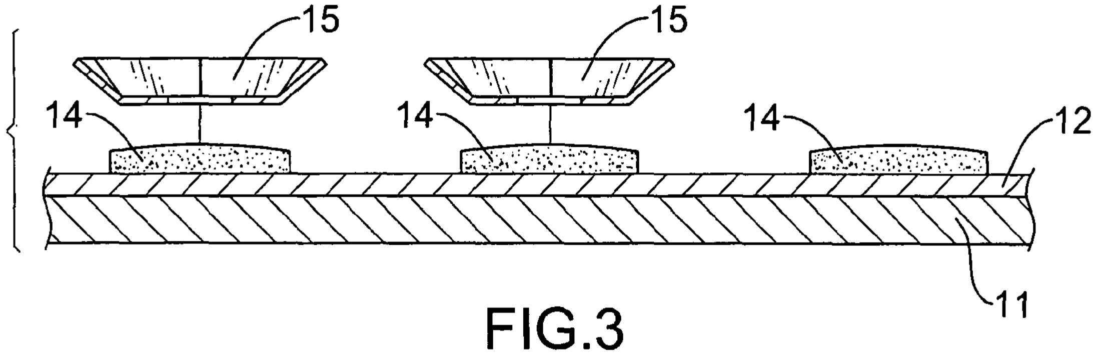
FIG. 3 is an exploded cross sectional side view of a second embodiment of the illustrated card with paillettes in FIG. 1.

With further reference to FIG. 3, the adhesive spots (14) are attached to the pattern ink layer (12), are mounted in the recesses (13) in the first embodiment of the illustrated card, are mounted directly on the pattern ink layer (12) to arrange the pattern in a second embodiment of the illustrated card and are mounted respectively on the pigment spots (17) in the third embodiment of the illustrated card.

The paillettes (15) are mounted respectively on the adhesive spots (14) and has various colors and shapes such as circular, star, flower or the like and may be flat or three-dimension.

Before the paillettes (15) are mounted on the adhesive spots (14), each of the printing layer can be covered by a release paper (16) as shown in FIG. 2.

Figure 5:
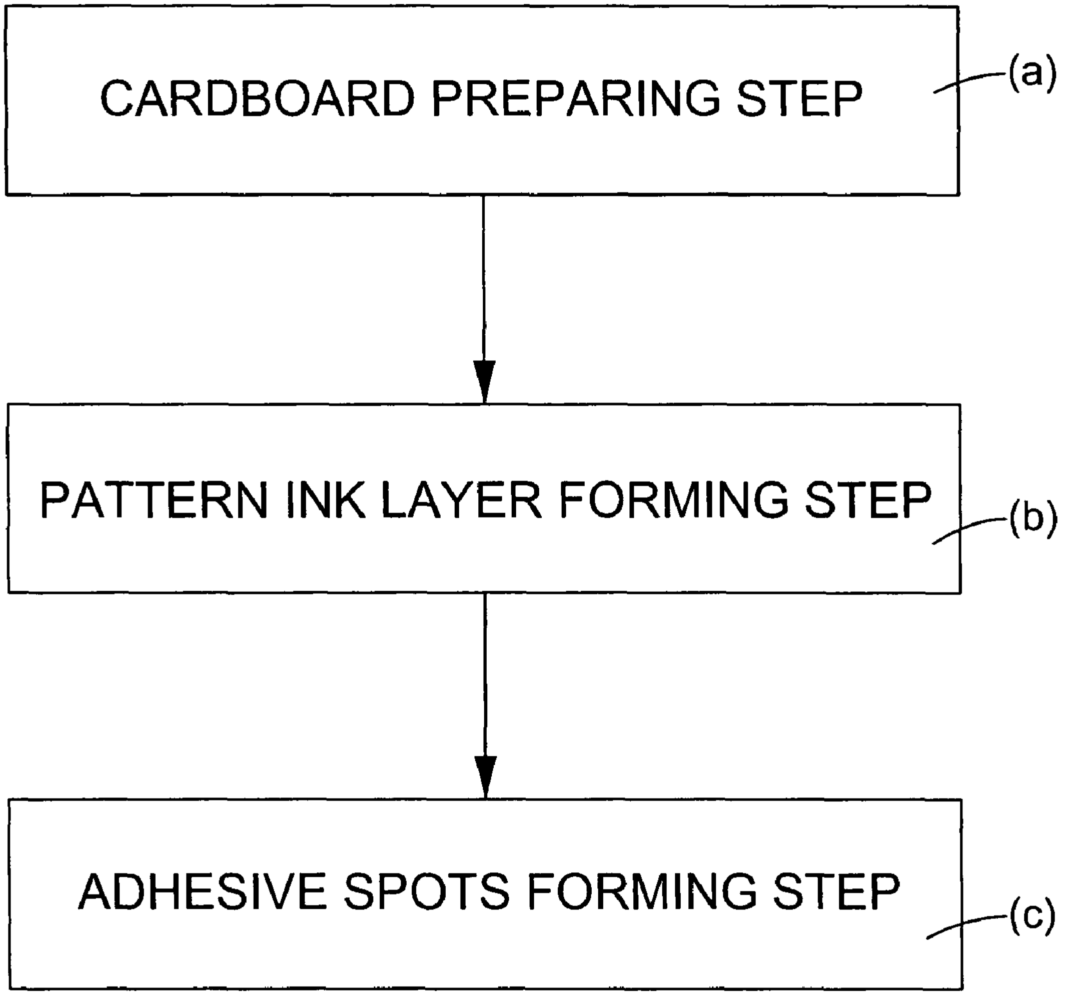
FIG. 5 is a flow chart of a method to produce an illustrated card in accordance with the present invention.

With further reference to FIG. 5, a method to produce the illustrated card in accordance with the present invention has a cardboard preparing step (a), a pattern ink layer forming step (b) and an adhesive spots forming step (c).

The cardboard preparing step (a) has preparing a cardboard (11).

The pattern ink layer forming step (b) has printing ink on at least on surface of the cardboard (11) to form a pattern ink layer (12). The ink covers a whole surface of the cardboard (11) when the second and the third embodiments of the illustrated card are produced. The ink covers part of the surface of the cardboard (11) to form multiple recesses (13) in the first embodiment of the illustrated card. The pattern ink layer (12) forming step (b) further has printing multiple pigments on the pattern ink layer (12) after printing the ink to form the pattern ink layer (12) with multiple pigment spots (17).

The adhesive spots forming step (c) has printing adhesives to form multiple adhesive spots (14) to the pattern ink layer (12) for receiving multiple paillettes (15). The adhesives are printed respectively in the recesses (13) when the first embodiment of the illustrated card is produced. The adhesives are printed directly on the pattern ink layer (12) when the second embodiment of the illustrated card is produced. The adhesives are printed respectively on the pigment spots (17) when the third embodiment of the illustrated card is produced.

The illustrated card allows users especially children to make the illustrated card by themselves and children can be trained to arrange the paillettes with different colors to improve their sense of chromatology. Additionally, the users can mount directly the paillettes on the adhesive spots (14) without contaminating their hands or clothes, so it is convenient for the users.

Figure 6:
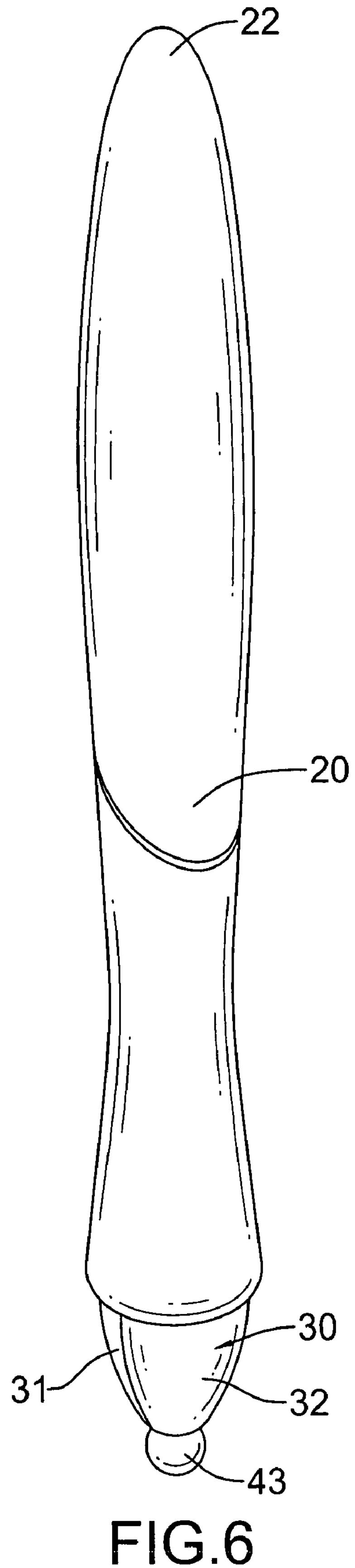
FIG. 6 is a perspective view of a tool in accordance with the present invention for making an illustrated card with paillettes.

With further reference to FIG. 6, a tool in accordance with the present invention for making an illustrated card with paillettes has a body (20).

The body (20) is longitudinal and pen-like so users may hold the body (20) as simply as they hold a pen. The body (20) has an adhesive end and a blunt end (22).

Figure 7:
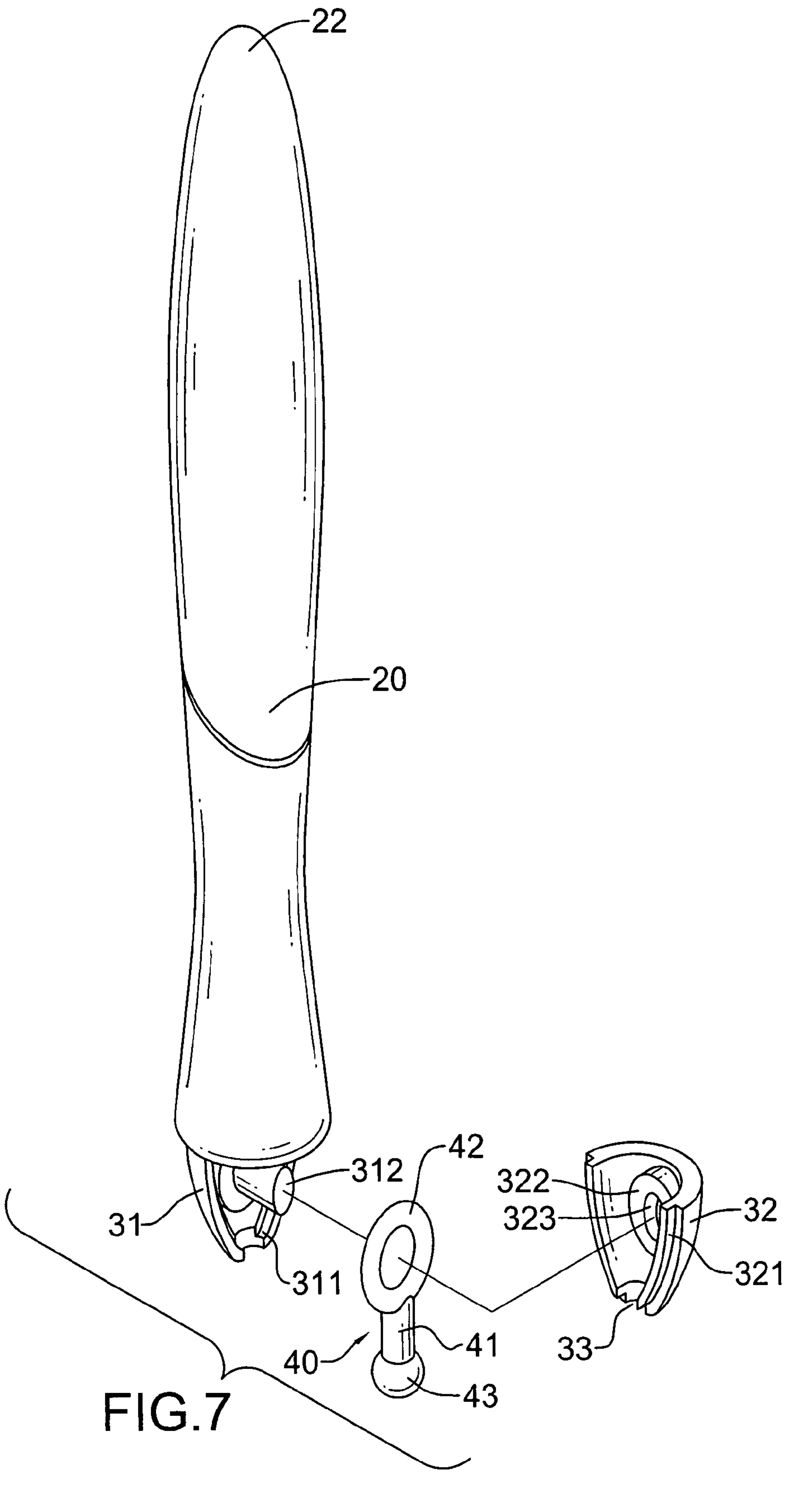
FIG. 7 is an exploded perspective view of the tool in FIG. 6.

With further reference to FIG. 7, the adhesive end has a fastener (30) and an adhesive element (40).

The fastener (30) is conical, protrudes from the adhesive end of the body (20) and has an inner space, an enlarged end, a narrow end, a first half (31) and a second half (32).

The enlarged end is mounted on the adhesive end of the body (20).

The narrow end has a through hole (33). The through hole (33) is defined through the narrow end and communicates with the inner space of the fastener (30).

The first half (31) is formed integrally on the adhesive end of the body (20) and has an inner surface and two opposite side edges. The inner surface may have a protrusion (312) or a hollow protrusion. Each of the side edges has a first detent (311). The first detent (311) is formed in the side edge. The protrusion (312) protrudes from the inner surface. The hollow protrusion protrudes from the inner surface and has a mounting hole. The mounting hole is formed in the hollow protrusion.

The second half (32) is combined detachably with the first half (31) and has an inner surface and two opposite side edges. The inner surface may have a protrusion or a hollow protrusion (322). The protrusion protrudes from the inner surface. The hollow protrusion (322) protrudes from the inner surface has a mounting hole (323). The mounting hole (323) is formed in the hollow protrusion (322) and corresponds to the protrusion (312) of the first half to receive the protrusion (312), so the first and second halves (31, 32) are combined securely. Each of the side edges has a second detent (321). The second detent (321) is formed on the side edge and is mounted in one of the first detent (311) of the first half (32) to fasten the two halves (31, 32) firmly.

The adhesive element (40) is made of resin that has tiny stickiness such as thermoplastic resin (TPR) or silicone, is fastened by the fastener (30), is mounted in the inner space of the fastener (30) and protrudes from the through hole (33). The adhesive element (40) has a cylindrical segment (41), a fastening ring (42) and a sphere protrusion (43). The cylindrical segment (41) is mounted in the inner space of the fastener (30) and has a proximal end and a distal end. The fastening ring (42) is formed integrally from the proximal end of the cylindrical segment (41) and has a fastening hole. The fastening hole is mounted around the protrusion (312) of one of the first and second halves (31, 32) to fasten the adhesive element (40) to the fastener (30). The sphere protrusion (43) protrudes from the distal end of the cylindrical segment (41), is mounted out of the through hole (33) of the fastener (30) to adhere to the paillettes and may have various diameter corresponding to various dimension of the paillettes.

When users use the tool, they can use the sphere protrusion (43) to make the illustrated card by a method comprising an adhering step, a pressing step and a repeating step.

Figure 8:
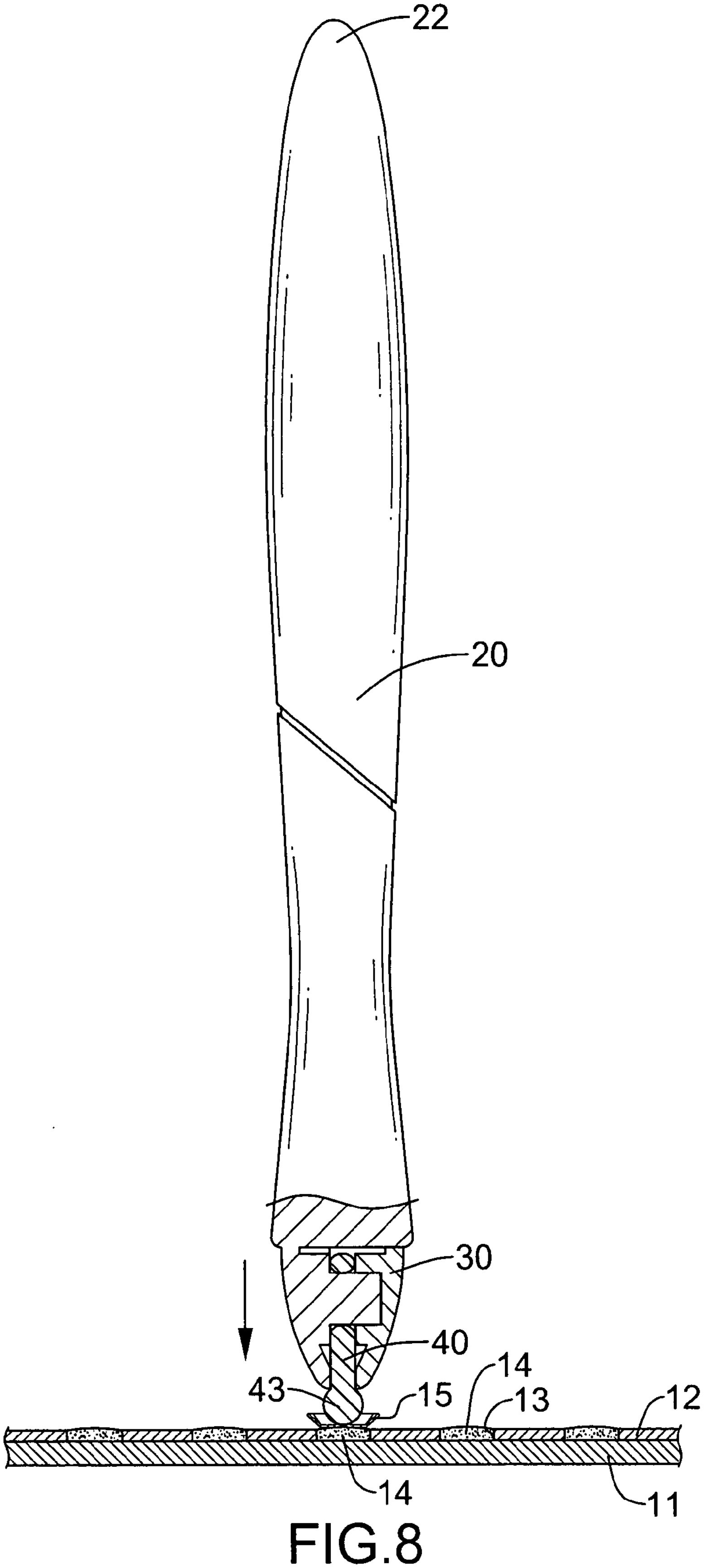
FIG. 8 is a side view in partial section of the tool in FIG. 6 that shows an adhesive end is used to put a paillette on an illustrated card of the present invention.

With further reference to FIG. 8, the adhering step comprises using the sphere protrusion (43) of the adhering element (40) of the tool to adhere one of the paillettes and putting the paillette on one of the adhesive spots (14). Because the adhesive spot has a stronger stickiness than the adhering element (40) does, the paillette will stay on the adhesive spot (14).

Figure 9:
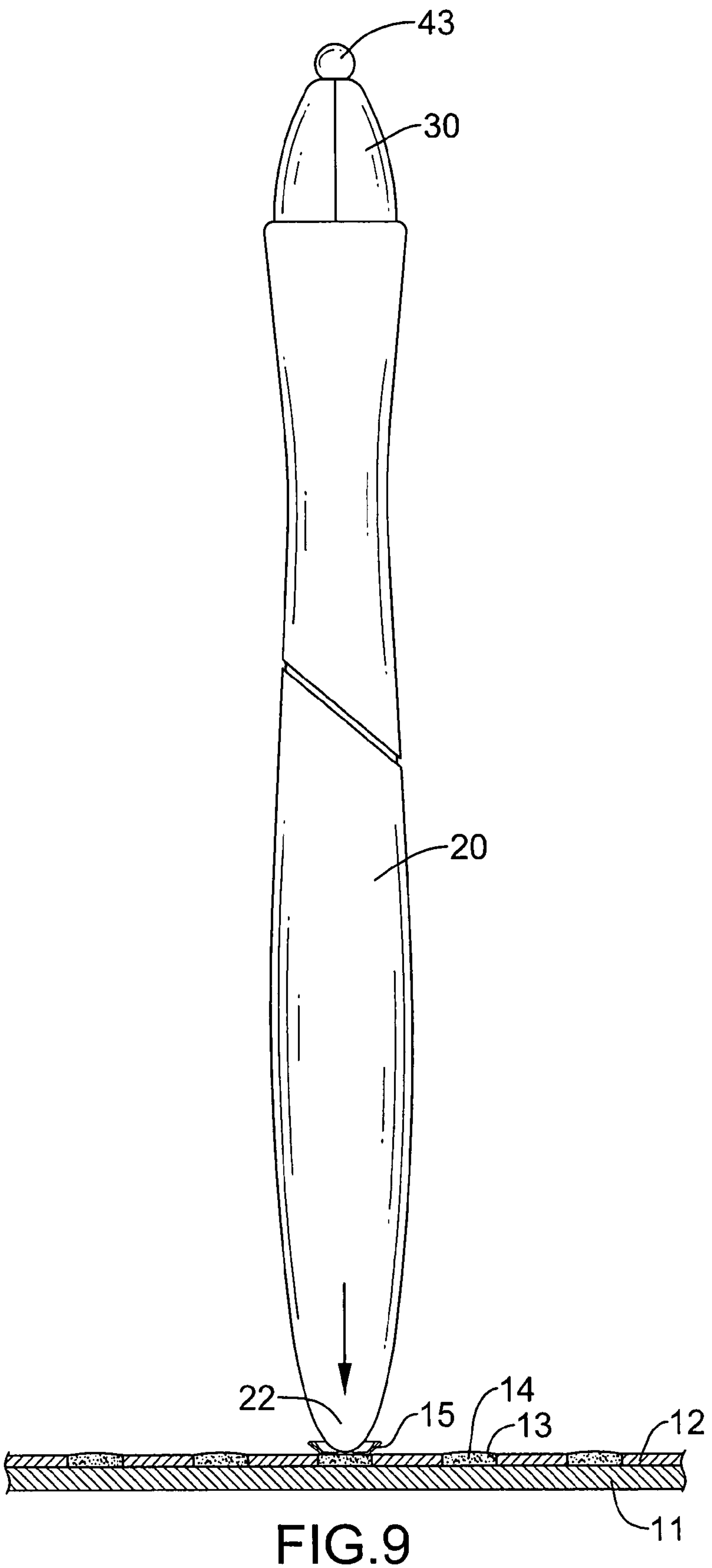
FIG. 9 is a perspective view of the tool in FIG. 6 that shows a blunt end is used to press a paillette toward an illustrated card of the present invention

With further reference to FIG. 9, the pressing step comprises using the blunt end (22) to press the paillette toward the adhesive spot (14), so the paillette can adhere firmly to the illustrated card.

The repeating step comprises repeating the adhering step and the pressing step to allow all the adhesive spots (14) to adhere to the paillettes.

The paillettes can be adhered more easily and rapidly by the adhesive element (40) than by a user's hand. Thus, using the tool of the present invention to make the illustrated card is convenient for the users.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A tool comprising a body having
a blunt end; and
an adhesive end having
a fastener protruding from the adhesive end of the body; and
an adhesive element being made of resin and fastened by the fastener,
wherein the fastener of the adhesive end has
an inner space;
an enlarged end mounted on the adhesive end of the body;
a narrow end having a through hole defined through the narrow end and communicating with the inner space of the fastener; and
two halves combined detachably to each other, wherein one of the halves is formed integrally on the adhesive end of the body and has
an inner surface having a protrusion protruding from the inner surface; and
two side edges, each side edge having a first detent formed in the edge; and
the other half has
an inner surface having a hollow protrusion protruding from the inner surface having a mounting hole formed in the hollow protrusion and corresponding to the protrusion of the one of the halves to receive the protrusion to combine the halves securely; and
two opposite side edges, each side edge having a second detent formed on the side edge and pressed mounted in one of the first detents to fasten the two halves firmly; and
the adhesive element is mounted in the inner space of the fastener, partially protrudes from the through hole of the narrow end of the fastener and has
a cylindrical segment mounted in the inner space of the fastener and having
a proximal end; and
a distal end;
a fastening ring formed integrally from the proximal end of the cylindrical segment and having a fastening hole mounted around the protrusion of the one of the halves to fasten the adhesive element to the fastener; and
a sphere protrusion protruding from the distal end of the cylindrical segment and mounted out of the through hole of the fastener.

2. The tool as claimed in claim 1, wherein the adhesive element is made of thermoplastic resin.

3. The tool as claimed in claim 1, wherein the adhesive element is made of silicone.

* * * * *